United States Patent [19]

Gisbourne

[11] Patent Number: 4,827,579
[45] Date of Patent: May 9, 1989

[54] JOINTING OF FABRIC ENDS

[75] Inventor: Bryan J. Gisbourne, Blackburn, England

[73] Assignee: Scapa-Porritt Limited, Blackburn, England

[21] Appl. No.: 131,463

[22] Filed: Dec. 11, 1987

[30] Foreign Application Priority Data

Dec. 13, 1986 [GB] United Kingdom ............... 8629847

[51] Int. Cl.$^4$ .............................................. A44B 19/36
[52] U.S. Cl. ........................................ 24/391; 24/389
[58] Field of Search ............. 24/391, 389, 33 P, 33 C, 24/33 K, 33 M

[56] References Cited

U.S. PATENT DOCUMENTS

| 2,018,099 | 10/1935 | Sundback | 24/391 |
| 3,263,291 | 8/1966 | Taylor | 24/391 |
| 3,541,649 | 11/1970 | Sim | 24/391 |
| 4,035,872 | 7/1977 | MacBean | 24/33 P |
| 4,091,509 | 5/1978 | MacFee | 24/391 |
| 4,419,793 | 12/1983 | Moertel | 24/391 |

FOREIGN PATENT DOCUMENTS 1348098  3/1974  United Kingdom ............... 24/391

Primary Examiner—Victor N. Sakran
Attorney, Agent, or Firm—Fleit, Jacobson, Cohn & Price

[57] ABSTRACT

A jointing device for connecting together the ends of a papermakers or like fabric including coil elements (13, 14) attachable to the respective fabric ends, the end regions (20, 21) of the individual turns of the coils being so profiled as inherently to maintain, on interdigitation of the coil, a degree of interengagement which is sufficient to provide and maintain a tunnel (16) to receive a pintle wire (15) into engagement therewith. It is suggested that the coils be such as to be capable of interdigitation by a mechanical device such as, for example, a slider (22).

9 Claims, 2 Drawing Sheets

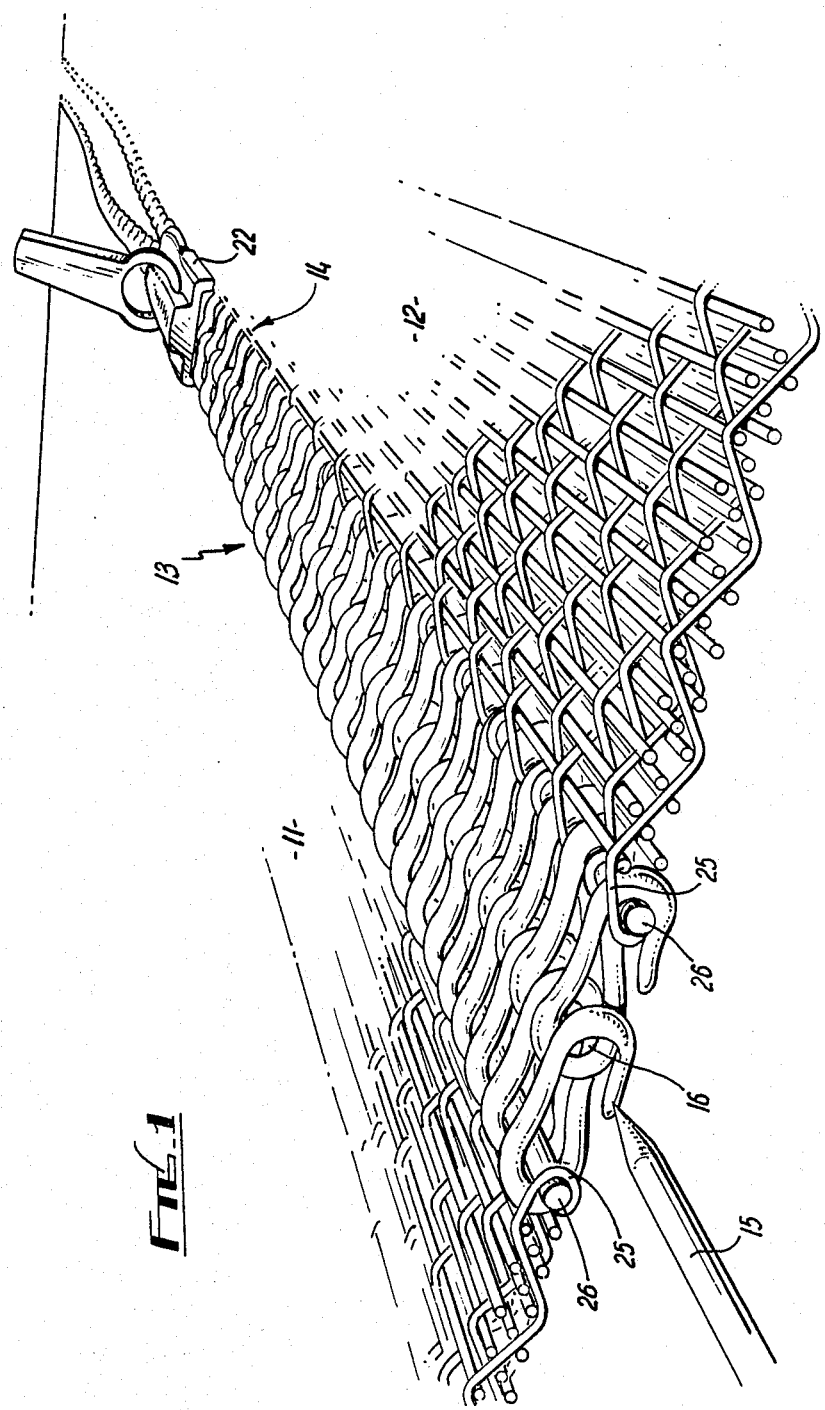

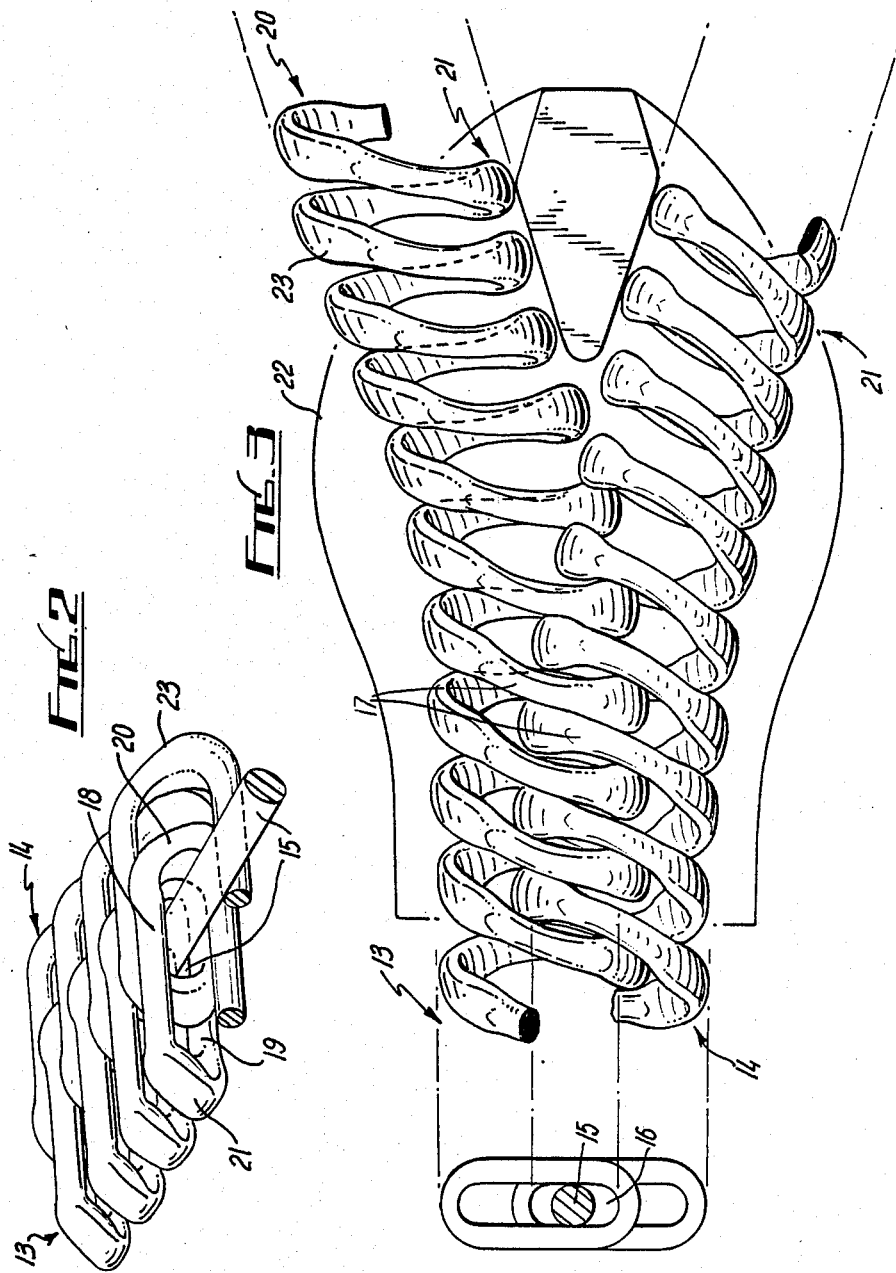

JOINTING OF FABRIC ENDS

The invention concerns papermachine clothing and the like, and has more particular reference to a method of and a means for joining the ends of a papermakers fabric to create an endless band.

Difficulty has been experienced in joining together the ends of a papermakers fabric, the very size and weight of a typical such fabric militating against the ready interdigitation of the loops provided at the opposing fabric ends and the engagement of a pintle wire throughout the full axial extent of the resultant tunnel.

It has been proposed to provide a part of a temporary fastening means on each of the ends to be joined and to utilise such temporary means to bring the ends into a relative disposition wherein the loops on the respective ends are interengaged and capable of receiving a pintle wire, the temporary means being removed once the pintle wire is placed in position. A typical temporary fastening means comprises a sliding clasp fastener arrangement wherein the tapes are secured to the respective ends of the papermakers fabric and a slider cooperates with formations on the said tapes to bring the same into mutual engagement.

The object of the invention is to facilitate the connecting together of the ends of a papermakers fabric or the like without the inconvenience of a temporary fastening means of the kind hitherto proposed.

According to one aspect of the present invention there is proposed, in or for a papermakers or like fabric, jointing means comprising loop forming elements connectable with the respective fabric ends, the elements of one of the said respective fabric ends being intended for interdigitation with the elements of the other fabric end when the said ends are arranged in opposed adjacent relationship, and a pintle wire for engagement with the interdigitated loop forming elements, characterised in that the loop forming elements are adapted and arranged, upon interdigitation thereof, to form and maintain a pintle wire receiving tunnel through the side-by-side loops.

In a preferred arrangement each loop-forming element comprises a coil connectable to a respective fabric end, some at least of the turns of the coil being profiled to provide for a predetermined minimum extent of maintained engagement of such turns between successive turns of an adjacent coil arranged in interdigitated relationship therewith.

According to a further preferred feature, the coil turns are shaped for cooperation with a mechanical means arranged upon movement thereof longitudinally of adjacent such elements to bring such elements into interdigitated relationship.

According to a still further preferred feature, the mechanical means aforesaid comprises a slider.

The invention also includes the method of connecting together fabric ends which comprises the steps of providing loop forming elements at the ends to be joined, bringing said loop forming elements into interdigitated disposition to provide a tunnel through aligned side-by-side loops of such elements, the loop forming elements being adapted and arranged to be cooperable to maintain both interdigitation and the tunnel aforesaid and introducing a pintle wire into the said tunnel.

According to another aspect of the invention, a jointing means for connecting together the opposed ends of a papermakers or like fabric, which jointing means includes a coil for attachment to each respective fabric end and a pintle wire for engagement with the tunnel formed by said coils on side-by-side interdigitation thereof, is characterised in that each said coil comprises a multiplicity of coaxially arranged coil turns each of generally planar configuration, successive coil turns being connected together along a common edge of the coil and such successive turns defining therebetween a generally parallel-sided space extending substantially perpendicular to the coil axis, the material of the coil, at that part of each coil turn remote from the said common edge, being of increased dimension in the longitudinal direction of the coil relative to the corresponding dimension of the adjacent part of the respective coil, for cooperation with like corresponding parts of the respective adjacent turns of an opposed coil and with which each said turn is engaged to maintain said engagement at least to a predetermined minimum extent.

According to a further preferred feature, the said increased dimension part of each coil turn terminates at either end thereof, as considered in the peripheral direction of the turn, in convergent regions which define flanks inclined to the axis of the coil, opposing flanks of the successive turns of interengaged coils cooperating to determine the said minimum extent of engagement of the coils.

According to a still further preferred feature, the material of the coil is of increased dimension, in the longitudinal direction of the coil, in the region of the said common edge of the coil.

The invention will now be described further, by way of example only, with reference to the accompanying drawings illustrating one embodiment thereof and in which:

FIG. 1 is a diagrammatic perspective view of a part of a papermakers fabric and shows the ends thereof as joined in accordance with the invention;

FIG. 2 is a diagrammatic perspective view of the joining elements of the invention as arranged in interdigitated disposition and with a pintle wire in engagement therewith; and FIG. 3 illustrates the interdigitation of the loop forming elements by means of a slider.

Referring now to the drawings, and particularly to FIG. 1 thereof, the ends 11, 12 of a papermakers fabric are connected together by jointing means comprising helical coils 13, 14 connected to the respective fabric ends and a pintle wire 15 engaged with the tunnel 16 formed by and between the interdigitated turns 17 of the coils.

As can be seen from FIG. 2, the coils 13, 14 are of flattened form when viewed in end elevation, each turn being defined by spaced parallel limbs 18, 19 extending between generally semi-circular end regions 20, 21. The coils are formed from a synthetic plastics monofilament material and the material of the coil is of increased dimension, in the axial direction of the coil, in the said end regions. Indeed, in the said end regions the coils are profiled to provide enlargements or hammer ends which, on interdigitation of the coils, cooperate to militate against separation of the coils and, furthermore, maintain at least a minimum extent of engagement of the coils, the minimum extent of engagement being that degree of engagement such as will provide a tunnel adequate to receive the pintle wire.

The coils 13, 14 are brought into interdigitated relationship by means of a slider 22 of conventional form, such slider 22 operating on the remote flanks 23, 24 of the end regions 20, 21 of the respective coils, as is illustrated in FIG. 1.

Upon interdigitation of the coils 13, 14 by means of the slider 22, a pintle wire is introduced into tunnel 16, cooperation between the profiled end regions 20, 21 of the coil serving to maintain the tunnel at a transverse cross-section sufficient to allow for the ready insertion of the wire.

The coils, 13, 14 may be applied to the fabric ends in any convenient manner, FIG. 1 illustrating an arrangement wherein the turns 17 of the coils are introduced between warp loops 25 of the respective said ends and a pintle wire 26 is engaged with such warp loops 25 and coil turns 17.

In another arrangement the coils may be engaged directly with the warp yarns of the fabric ends, for example in accordance with the procedure disclosed in our prior U.K. Pat. No. 1348098, in which case a pintle wire such as pintle wire 26 of FIG. 1 will not be required.

If desired the coils, may be provided on respective strips of webbing which are sewn or otherwise secured to the respective fabric ends, the coils being fully interengaged by means of the slider and the hinge wire being subsequently introduced. Alternatively, the hinge wire can be progressively introduced as the slider moves along the coils and brings the same into interdigitated relationship.

Although in the embodiment hereindescribed the whole of the end regions of the turns of the coil are profiled (or thickened), the required security of interengagement of coils can be attained merely by providing one or more enlargements on a lateral surface of the material of a coil in such position as to cooperate with a corresponding (or complementary) formation on the adjacent surface of the coil interdigitated therewith to give a tunnel of the desired transverse dimension.

What is claimed is:

1. Jointing means for connecting the ends of a papermakers or like fabric, said jointing means comprising:
   loop forming elements connectable with the respective fabric ends, said loop forming elements being coextensive with said ends, and said loop forming elements at said respective fabric ends being intended for mutual interdigitation with the elements of the other fabric end when said ends are arranged in opposed adjacent relationship such that side-by-side loops of said loop-forming elements form a tunnel of a length corresponding to the length of said loop-forming elements, and a pintle wire for engagement with the interdigitated loop forming elements through said tunnel, said pintle wire being of a length to extend throughout and substantially the whole extent of said tunnel and said loop-forming elements being arranged so as to cooperate to maintain the pintle wire receiving tunnel formed by and through the side-by-side loops.

2. Jointing means as claimed in claim 1, wherein each loop-forming element comprises a coil connectable to a respective fabric end, some at least of the turns of the coils being profiled to provide a predetermined minimum extent of maintained engagement of such turns between successive turns of an adjacent coil arranged in interdigitated relationship therewith to thereby maintain said tunnel.

3. Jointing means as claimed in claim 2, wherein the loop forming elements are shaped for cooperation with a mechanical means arranged upon movement thereof longitudinally of adjacent such elements to bring such elements into interdigitated relationship.

4. Jointing means as claimed in claim 3, wherein the mechanical means comprises a slider.

5. A jointing means for connecting together the opposed ends of a papermakers or like fabric, said jointing means comprising:
   a coil for attachment to each respective fabric end and a pintle wire for engagement with a tunnel formed by said coils on side-by-side interdigitation thereof, said pintle wire being of a length to extend throughout a complete axial extend of said tunnel and each said coil comprises a multiplicity of coaxially arranged coil turns each of generally planar configuration, successive coil turns being connected together along a common edge of the coil and such successive turns defining therebetween a generally parallel-sided space extending substantially perpendicular to the coil axis, the material of the coil, at that part of each coil turn remote from said common edge, being of increased dimension in the longitudinal direction of the coil relative to the corresponding dimension of the adjacent part of the respective coil, for cooperation with like corresponding parts of the respective adjacent turns of an opposed coil and with which each said turn is engaged to maintain said engagement at least to a predetermined minimum extent.

6. A jointing means as claimed in claim 5, wherein the said increased dimension part of each coil turn terminates at either end thereof, as considered in the peripheral direction of the turn, in convergent regions which define flanks inclined to the axis of the coil, opposing flanks of the successive turns of interengaged coils cooperating to determine the said minimum extent of engagement of the coils.

7. A jointing means as claimed in claim 6, wherein the material of the coil is of increased dimension, in the longitudinal direction of the coil, in the region of the said common edge of the coil.

8. The method of connecting together fabric ends, said method comprising the steps of:
   providing loop forming elements at the ends to be joined,
   bringing said loop forming elements into interdigitated disposition to provide a tunnel through aligned side-by-side loops of such elements, the loop forming elements being arranged to be cooperable to maintain both interdigitation and said tunnel, and
   introducing a pintle wire into said tunnel, said pintle wire being of a length to extend through a complete axial extent of said tunnel.

9. An endless papermakers or like fabric comprising:
   a fabric having opposed ends, and
   jointing means connecting said opposing ends to bring the fabric into an endless form, said jointing means including a loop-forming element at each respective end, said loop-forming elements being co-extensive with said opposing ends and each having side-by-side loops arranged, upon interdigitation of the loop-forming elements, to form a tunnel extending parallel to said opposing ends, a pintle wire extending throughout the full length of said tunnel and engaging said loop-forming elements, some at least of the loops of the respective loop-forming elements being profiled for cooperative engagement with loops of the other loop-forming element to ensure a minimum depth of maintained engagement therebetween on interdigitation of the loop-forming elements to provide said tunnel.

* * * * *